May 7, 1968  C. S. COCKERELL  3,381,772
FLEXIBLE SKIRTS FOR VEHICLE FOR TRAVELLING
OVER LAND AND/OR WATER
Filed May 6, 1965  2 Sheets-Sheet 1

INVENTOR
C. S. COCKERELL
BY
Cameron, Kerkam & Sutton
ATTORNEYS

May 7, 1968     C. S. COCKERELL     3,381,772
FLEXIBLE SKIRTS FOR VEHICLE FOR TRAVELLING
OVER LAND AND/OR WATER
Filed May 6, 1965     2 Sheets-Sheet 2

INVENTOR
C. S. COCKERELL
BY
Cameron, Kerkam & Sutton
ATTORNEYS

United States Patent Office 3,381,772
Patented May 7, 1968

3,381,772
FLEXIBLE SKIRTS FOR VEHICLE FOR TRAVELLING OVER LAND AND/OR WATER
Christopher Sydney Cockerell, Bassett, Southampton, England, assignor to Hovercraft Development Limited, London, England, a company of Great Britain and Northern Ireland
Continuation-in-part of applications Ser. No. 837,502, Sept. 1, 1959, and Ser. No. 329,562, Dec. 10, 1963. This application May 6, 1965, Ser. No. 453,656
Claims priority, application Great Britain, Sept. 1, 1958, 27,978/58
6 Claims. (Cl. 180—128)

ABSTRACT OF THE DISCLOSURE

A gas cushion vehicle having a flexible skirt structure forming at least part of the peripheral boundary of the gas cushion which includes a wall composed of an array of flexible tubular elements arranged in side-by-side relation. The tubular elements are either disposed sufficiently close together to form a substantially continuous wall, or are spaced apart and support a flexible membrane which serves to form a gas-tight enclosure for the cushion. The skirt structure may include a plurality of such flexible walls spaced from one another, the space between the walls being made gas-tight and inflated, and the tubes may be used to conduct pressurised fluid to the lower edge of the structure for the formation of a fluid curtain therebeneath.

---

Figure 1:
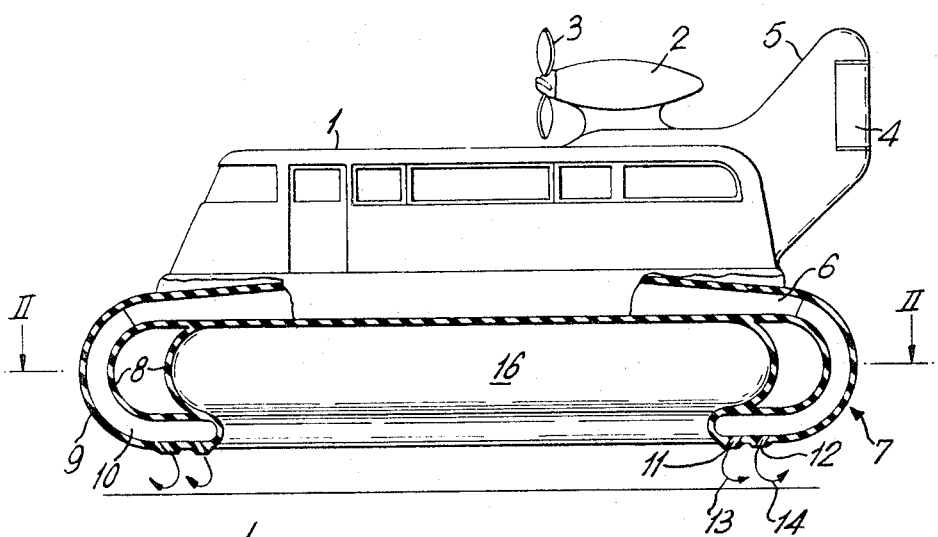

This is a continuation-in-part of applications Ser. Nos. 837,502 filed Sept. 1, 1959, and 329,562, filed Dec. 10, 1963, now patents No. 3,182,739 and 3,182,740, respectively.

This invention relates to vehicles for travelling over a surface and which, in operation, are supported above that surface by one or more cushions of pressurised gas formed and contained beneath the vehicle body.

In particular this invention is concerned with such gas cushion supported vehicles in which at least part of the peripheral boundary of a gas cushion is formed by flexible means extending below the body of the vehicle as described and claimed in said patents Nos. 3,182,739 and 3,182,740.

The flexible means by which the gas cushion is contained beneath the vehicle may take the form of a skirt structure made of flexible material which extends around the whole or just a part of the periphery of the cushion space within which the pressurised gas cushion is to be formed. Such a skirt structure can conveniently provide ducting whereby fluid is directed to the bottom of the skirt structure so as to issue therefrom with a component of velocity across the clearance which in operation is set up between the bottom of the skirt and the surface over which the vehicle is travelling so as to result in the formation of a curtain of moving fluid which reduces the escape of pressurised gas from the cushion space under the lower edge of the skirt structure.

An object of this invention is to provide a flexible skirt structure for vehicles of the kind described.

It is also an object of the invention to provide a flexible skirt structure for gas cushion supported vehicles which will have an acceptable degree of flexibility.

Another object of the invention is to provide a flexible skirt structure for a gas cushion supported vehicle which will combine an acceptable degree of flexibility with resilience and an adequate resistance to the pressure within the gas cushion.

Yet another object of the invention is to provide a flexible skirt structure which will be relatively light and flexible, which will withstand the pressure of the gas within the supporting gas cushion and will also provide the means for conveying pressurised fluid to the lower edge of the skirt for the formation therefrom of a curtain of moving fluid which assists in the retention of the gas cushion beneath the vehicle.

Accordingly this invention provides a vehicle for travelling over a surface and adapted to be supported above said surface at least in part by a cushion of pressurised fluid contained beneath the vehicle in a cushion space located between the underside of the vehicle and the surface over which it is travelling, comprising a flexible structure extending along at least part of the periphery of the cushion space and constituting at least an upper part of the cushion boundary, said flexible structure including a wall composed of an array of flexible elements arranged in side-by-side relation. The separate elements may be in the form of tubes so that they may be used to conduct pressurised fluid, usually gas, to the lower edge of the structure for the formation of a fluid curtain below it. Such an array of tubes will have a stiffness which depends in part upon the pressure of the fluid within the tubes. The elements may be arranged sufficiently close together to form a substantially continuous wall but leakage of gas between the elements may be prevented by the addition of a flexible membrane which is supported by the elements. If this is done the elements or tubes may be spaced apart so as to act as stiffening ribs supporting the impervious membrane which acts as the boundary of the gas cushion. If desired, however, the elements in the form of tubes may be arranged close together and the membrane provided with a fullness which enables the skirt structure to extend under the action of local impact or pressures so as to reduce the shock imparted to the vehicle by any such exceptional loads without allowing a great deal of gas to be lost from the pressurised gas cushion.

The wall composed of separate elements or tubes may constitute only part of a composite structure including a plurality of flexible walls spaced from one another and the space between two such walls may be made gas-tight and inflated so as to provide a flexible yet resilient structure.

Figure 2:
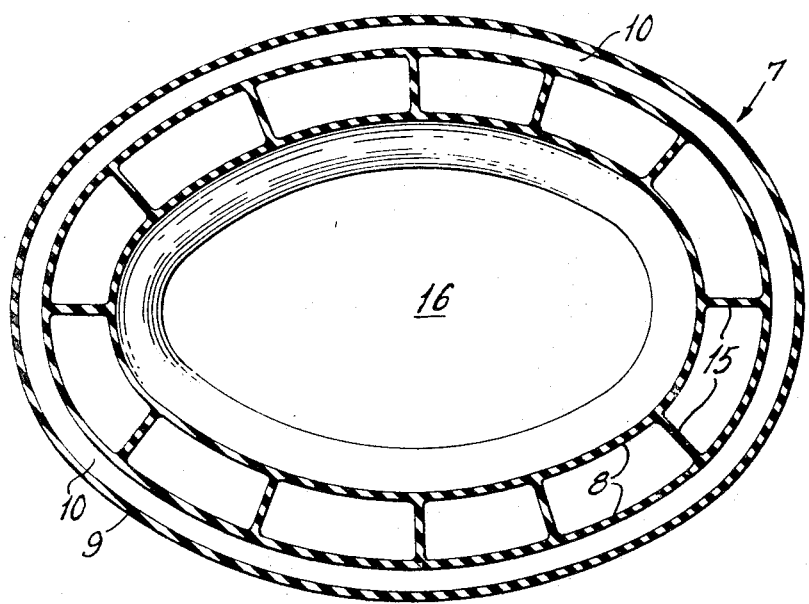
Figure 3:
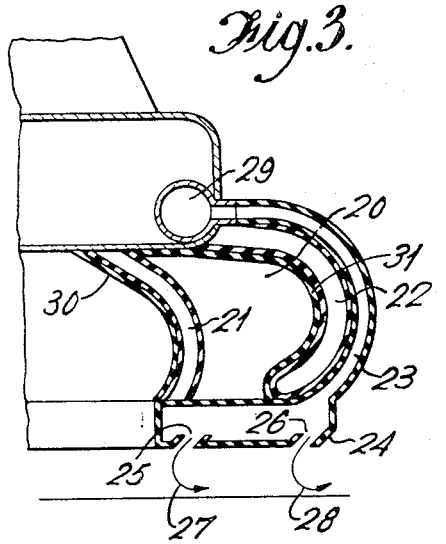
Figure 5:
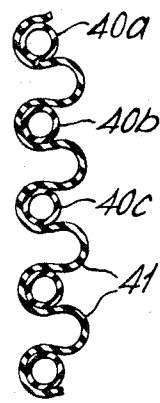
Figure 4:
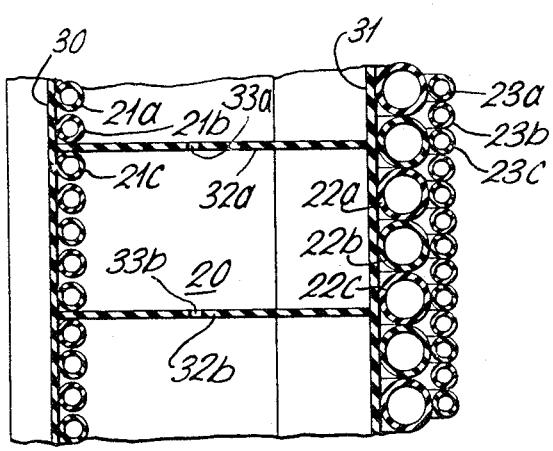

In the accompanying drawings:

FIGURE 1 is a side elevation partly in cross-section to one form of vehicle to which the invention may be applied, FIGURE 2 is a section on the line II—II of FIGURE 1, FIGURE 3 is a diagrammatic vertical cross-section of a part of a flexible skirt structure which may be applied to a vehicle of the kind shown in FIGURES 1 and 2, FIGURE 4 is a horizontal cross-section of a fragment of a skirt structure of modified form, and FIGURE 5 is a cross-section of a flexible wall structure according to the invention.

The vehicle shown in FIGURE 1 comprises a body structure 1, on which is mounted an engine 2 driving an air screw 3 for the propulsion of the vehicle. The vehicle is steered by a rudder 4 which forms part of a tail-fin 5 which serves to stabilise the directional attitude of the vehicle. In its lower part the vehicle has a duct 6 through which is directed pressurised air from a suitable engine-driven compressor or fan (not shown). The duct 6 extends all around the vehicle and communicates with an annular flexible skirt structure 7 which takes the form of a tube 8 of flexible material surrounded by an outer tubular skirt 9 which defines an annular duct 10 between itself and the outer wall of the tube 8. At the lower end of the duct 10 two ports 11 and 12 allow for the escape of pressurised air from the duct 10 to form curtains 13 and 14 of moving air which serve to resist the flow of air outwardly from under the vehicle.

The skirt structure 7 forms the lateral boundary of a cushion space 16 beneath the vehicle adapted to contain a cushion of pressurised air upon which the vehicle can ride. The pressurised cushion is formed by blowing air into the cushion space and means for doing this may be the same means as provided the air for the air curtains 13 and 14. Indeed these latter curtains may themselves provide the air to maintain the cushion pressure.

The cross-section of FIGURE 2 shows how the tubular structure 8 is divided by means of transverse membranes 15 into a plurality of cells each of which can sustain within itself a pressure different from that of its neighbours. This provides for the stabilisation of the vehicle in relation to the surface over which it is travelling.

According to this invention one or more of the elements of a flexible skirt structure such as that shown in FIGURES 1 and 2 may be composed of separate tubes arranged in side-by-side relation so as to form a substantially continuous wall. One such structure is shown in FIGURE 3 which is a vertical cross-section through a peripheral part of a vehicle and through the flexible skirt structure attached to it. In this structure a central tubular element 20 is bounded on the inside by a hollow flexible wall 21 and on the outside by a double wall 22, 23. This composite structure of walls 21, 22, 23 supports a duct 24 having ports 25, 26 for the supply of fluid to fluid curtains 27, 28 equivalent to fluid curtains 13 and 14 in FIGURE 1.

All three wall structures 21, 22 and 23 are built up of arrays of separate flexible tubular members as shown in cross-section in FIGURE 4. In this arrangement the duct 29 supplies pressurised air to the tubes 23a, 23b, 23c etc. (FIGURE 4), which go to make up the outermost wall 23 and these tubes deliver the air to the duct 24 from which it issues in the form of the air curtains 27 and 28. The tubes 22a, 22b, 22c etc. which go to make up the wall 22 and the tubes 21a, 21b and 21c etc. which go to make up the wall 21 may either be sealed top and bottom and inflated to a suitable pressure to impart the desired degree of resilience to the system or they may themselves contribute to the flow of air to the duct 24 and the formation of air curtains 27 and 28. As will be seen from the drawing the tubes are not necessarily all of the same cross sectional size. Thus the tubes 21a, 21b etc. forming the inner wall are shown of smaller cross section than the tubes 22a, 22b etc. of the outer wall, while the tubes 23a, 23b, etc. which supply air to the duct 24 are of smaller cross section than tubes 21a, 21b, etc. Thus the stiffnesses of the various assemblies can be matched to the pressures they are required to sustain and the degree of flexibility required.

In order to improve the air tightness of the wall structure a membrane 30 may be provided attached to the inner surface of the tubes 21a, 21b etc. to form an inner skin impervious to the escape of air from the cushion. A similar membrane 31 may also be provided attached to the tubes 22a, 22b, 22c etc. so as to completely enclose the space 20 which may then be inflated to a suitable pressure to provide the desired overall resilience in the structure. In order moreover to prevent pressure changes from point to point around the structure being dissipated by flow of air in the circumferential direction the space 20 may be divided into separate cells by radial membranes 32a, 32b etc. stretched between membranes 30 and 31. Holes 33a, 33b etc. in membranes 32a, 32b etc. may be provided to enable a restricted amount of pressure exchange to take place between the cells. Alternatively, of course, a membrane may be attached to the tubes 22a, 22b, 22c instead of the membrane 30.

It is not necessary that the flexible skirt structure include more than one wall. In FIGURE 5 there is shown in cross-section a fragment of wall structure which may be used by itself. This structure consists of an array of tubes 40a, 40b, 40c etc. interconnected by a flexible membrane 41 which is shown to have a corrugated form in cross-section thus providing a certain amount of slack between each pair of adjacent tubes 40. Such a structure must be provided with sufficient inherent stiffness, e.g. by inflating the tubes 40 to a suitable pressure, to enable it to support the pressure difference between the cushion pressure on one side of it and the atmospheric pressure on the other. Alternatively it may be restrained by ties tied back to the base of the vehicle within the cushion space. Such a structure which occupies in its normal state a configuration like that shown in FIGURE 5 has the advantage that if such a flexible skirt encounters waves or other obstacles in the path of the vehicle it can yield to the impact by expanding and riding over the obstacle, without allowing a great deal of air to escape from the pressurised cushion.

The skirt structures which have been described above may extend all the way round the vehicle. However, it will be understood that the characteristics required for a flexible skirt structure vary according to the position on the periphery of the vehicle at which the skirt is fixed. Thus a structure extending across the forward end of the vehicle should be capable of yielding in a rearward direction on impact with an obstruction and will be restored towards its normal position by the pressure of the gas cushion. The skirt structures at the sides of a vehicle on the other hand are apt to receive impacts having substantial components of force rearwardly of the vehicle which is, of course, longitudinally of the skirt structure. The use of an array of separate elements in the manner proposed by this invention is therefore particularly advantageous in this latter instance since the individual tubes can flex in the plane of the array almost as easily as they can transversely to it.

I claim:

1. A vehicle for travelling over a surface and adapted to be supported above said surface at least in part by a cushion of pressurised fluid contained beneath the vehicle in a cushion space located between the underside of the vehicle and the surface over which it is travelling, comprising a flexible structure extending along at least part of the periphery of the cushion space and constituting at least an upper part of the cushion boundary, said flexible structure including a wall composed of an array of flexible tubes connected by a membrane of flexible material attached thereto and serving to form a gas-tight enclosure for the cushion.

2. A vehicle as claimed in claim 1 including means for forming a fluid curtain extending below said flexible structure to increase the height of the cushion boundary.

3. A vehicle for travelling over a surface and adapted to be supported above said surface at least in part by a cushion of pressurised fluid contained beneath the vehicle in a cushion space located between the underside of the vehicle and the surface over which it is travelling, comprising a flexible structure extending along at least part of the periphery of the cushion space and constituting at least an upper part of the cushion boundary, said flexible structure including at least two flexible walls at least one of which is composed of flexible tubes carrying a gas-tight membrane.

4. A vehicle as claimed in claim 3 in which the space between the two walls is closed by a further membrane and is inflated.

5. A vehicle as claimed in claim 4 wherein the enclosed space between the two walls is compartmented by further flexible membranes which extend transversely between the walls.

6. A vehicle for travelling over a surface and adapted to be supported above said surface at least in part by a cushion of pressurised fluid contained beneath the vehicle in a cushion space located between the underside of the vehicle and the surface over which it is travelling, comprising a flexible structure extending along at least part of the periphery of the cushion space and constituting at least an upper part of the cushion boundary, said flexible structure including a wall comprising a plurality of rows of flexible tubes, the tubes of each row being in side-by-side relation and the tubes of one row being of different cross-section from the tubes of the next.

References Cited

UNITED STATES PATENTS

| | | | |
|---|---|---|---|
| 242,668 | 6/1881 | Male | 180—7 |
| 3,082,836 | 3/1963 | Billman | 180—7 |
| 3,173,509 | 3/1965 | Wernicke et al. | 180—7 |
| 3,216,519 | 11/1965 | Prickett | 180—7 |
| 3,248,086 | 4/1966 | Cockerell | 180—7 |
| 3,260,323 | 7/1966 | Henry | 180—7 |

A. HARRY LEVY, *Primary Examiner.*